(No Model.)  2 Sheets—Sheet 1.
J. W. KENNEDY.
BICYCLE SUPPORT.
No. 446,835.  Patented Feb. 17, 1891.
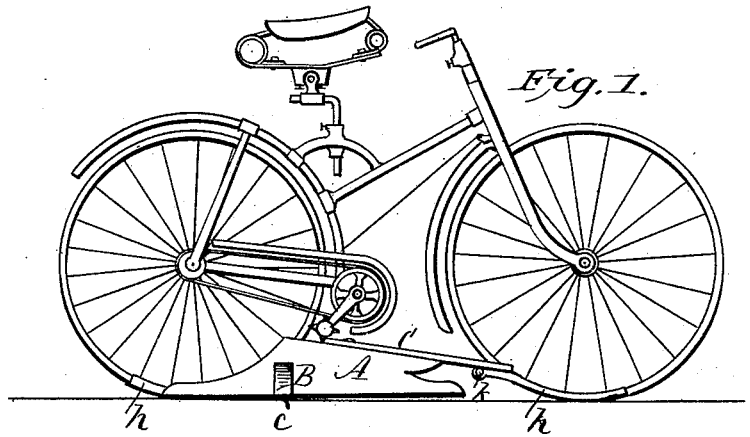
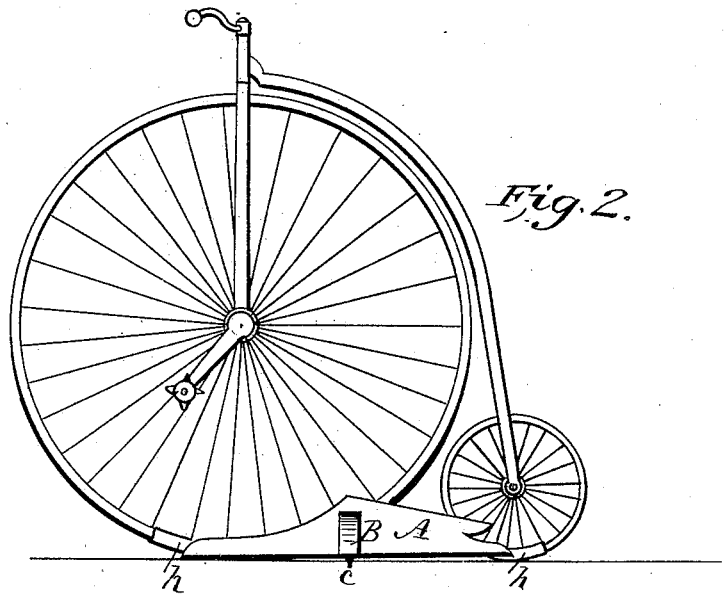
Witnesses.
A. S. Smith
E. D. McCall
Inventor.
John W. Kennedy,
pr R. L. Osgood,
Atty.
THE NORRIS PETERS CO., PHOTO-LITHO., WASHINGTON, D. C.

(No Model.) 2 Sheets—Sheet 2.
J. W. KENNEDY.
BICYCLE SUPPORT.
No. 446,835. Patented Feb. 17, 1891.
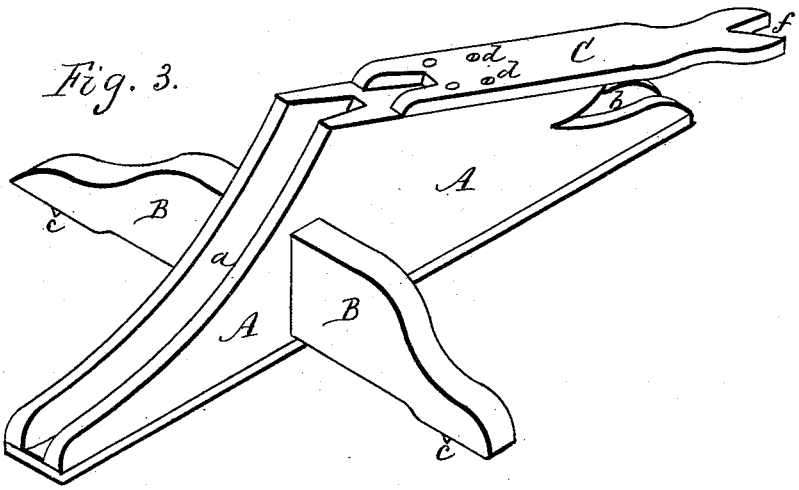
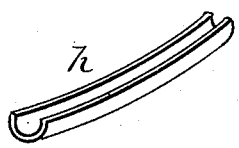
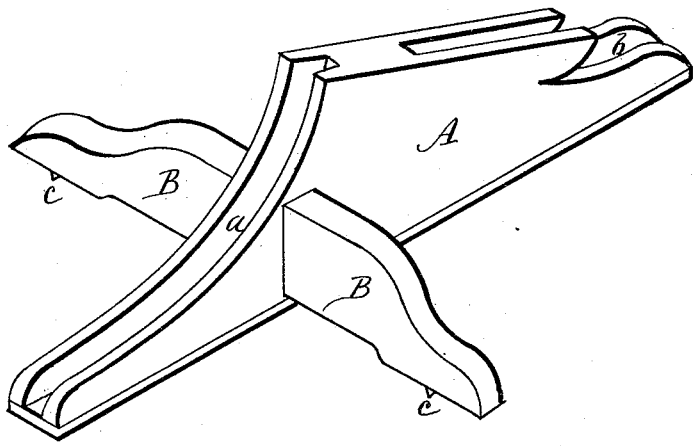
Witnesses.
A. S. Smith
F. L. McCall
Inventor.
John W. Kennedy,
R. F. Osgood,
Atty.
THE NORRIS PETERS CO., PHOTO-LITHO., WASHINGTON, D. C.

UNITED STATES PATENT OFFICE.

JOHN W. KENNEDY, OF ROCHESTER, NEW YORK, ASSIGNOR OF ONE-HALF TO FRANCIS L. HUGHES, OF SAME PLACE.

BICYCLE-SUPPORT.

SPECIFICATION forming part of Letters Patent No. 446,835, dated February 17, 1891.

Application filed July 5, 1890. Serial No. 357,718. (No model.)

*To all whom it may concern:*

Be it known that I, JOHN W. KENNEDY, of Rochester, in the county of Monroe and State of New York, have invented a certain new and useful Improvement in Bicycle-Supports; and I do hereby declare that the following is a full, clear, and exact description of the same, reference being had to the drawings accompanying this application.

My improvement relates to a stand for supporting bicycles; and it consists of a device adapted to receive what is known as the "Safety bicycle," having two wheels of nearly the same size, also the ordinary bicyle, having one large and one small wheel. The object is to make a bicycle self-supporting, and the device is of use in establishments where bicycles are kept on exhibition and sale, as well as for individual use. The invention consists in the construction and arrangement of parts hereinafter described and claimed.

In the drawings, Figure 1 is an elevation showing a Safety bicycle supported by the stand. Fig. 2 is a similar view showing the ordinary large and small wheeled bicycle supported by the stand. Figs. 3 and 4 are perspective views of the stand, adapted, respectively, to holding the two styles of bicycles. Fig. 5 is a perspective view of one of the troughs or linings for catching water.

The stand consists of a block A, of wood or other suitable material, and a cross-piece B, attached thereto by halving the parts together or by other means. This stand presents sufficient longitudinal and lateral surface to support any ordinary bicycle in an upright position and make it self-sustaining. The front and rear faces of the block A have segmental grooves $a$ and $b$, adapted to receive the wheels of the bicycle. The front groove is of much larger extent than the rear one, to enable it to take the large wheel of the ordinary bicycle, while the rear groove takes the small wheel. The cross-piece B is set somewhat backward of the center of the length of block A and is provided on its under side near the ends with pointed spurs $c\ c$, which form fulcrums on which the stand tilts, as will be hereinafter fully described.

C is an arm attached to the top of the block A on the rear end and projecting back some distance beyond the block. It is attached by screws $d\ d$ or other means, so that it can be adjusted forward and back, and it is provided at its rear end with a notch or cleft $f$, of sufficient size to receive the rim of the bicycle-wheel. The top of the block A, where this arm fits, is preferably somewhat inclined backward, as shown. This arm is used only in supporting the Safety bicycle—that is, one having both wheels nearly of the same size. In supporting the ordinary bicycle having one large and one small wheel the arm is removed and said large and small wheels simply fit in the grooves $a\ b$ of the block.

In use the bicycles are mounted as shown in Figs. 1 and 2. Where the Safety bicycle is mounted as shown in Fig. 1, the rear wheel, which has the preponderance of weight, is fitted in the groove $a$, and the arm C is fitted to the front wheel, so that the rim of the wheel rests in the notch $f$. The preponderance of weight on the rear of block A causes the same to tilt on the studs $c\ c$, thereby bringing the end of arm C in firm contact with the wheel, which it embraces, and preventing any loose motion. It tightens the device to the wheels. The spurs $c\ c$ also hold the stand in place and prevent it from being moved accidentally. The tilting action of the stand also has a similar effect to tighten the device to the wheels of the ordinary large-wheeled bicycle.

In some cases I employ troughs or linings $h\ h$, made of sheet metal, attached to the ends of the stand and serving to receive the wheels. These troughs hold water and prevent dripping on the floor. They may be attached either permanently or removably. That at the rear is hinged at $k$ to the arm C, so that it will allow the arm to rise with the tilting of the stand.

Having described my invention, what I claim as new, and desire to secure by Letters Patent, is—

1. The bicycle-stand herein described, consisting of the block A and cross-piece B, provided with spurs $c\ c$, whereby the stand can be tilted, the block having grooves $a\ b$ to receive the wheels, as shown and described, and for the purpose specified.

2. The combination, with the stand consisting of the grooved block A and cross-piece B, of the arm C, attached to the top of the block and provided with the notch $f$ at its outer end, as shown and described, and for the purpose specified.

3. The combination, with the stand consisting of block A, cross-piece B, and arm C, of the troughs or linings $h$ $h$, attached at opposite ends, as shown and described, and for the purpose specified.

In witness whereof I have hereunto signed my name in the presence of two subscribing witnesses.

J. W. KENNEDY.

Witnesses:
 R. F. OSGOOD,
 FRANK M. GOFF.